United States Patent
Hwang et al.

(10) Patent No.: US 11,156,837 B2
(45) Date of Patent: Oct. 26, 2021

(54) ELECTRONIC DEVICE HAVING A DISPLAY MODULE

(71) Applicant: LG ELECTRONICS INC., Seoul (KR)

(72) Inventors: Induck Hwang, Seoul (KR); Inho Choi, Seoul (KR); Hoyoung Choi, Seoul (KR); Hoon Hur, Seoul (KR); Hyeongseok Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 16/499,738

(22) PCT Filed: Aug. 16, 2019

(86) PCT No.: PCT/KR2019/010426
§ 371 (c)(1),
(2) Date: Sep. 30, 2019

(87) PCT Pub. No.: WO2021/033784
PCT Pub. Date: Feb. 25, 2021

(65) Prior Publication Data
US 2021/0208395 A1 Jul. 8, 2021

(51) Int. Cl.
*G02B 27/01* (2006.01)
*G02B 5/30* (2006.01)

(52) U.S. Cl.
CPC ....... *G02B 27/0172* (2013.01); *G02B 5/3016* (2013.01); *G02B 27/0176* (2013.01); *G02B 2027/014* (2013.01); *G02B 2027/0138* (2013.01); *G02B 2027/0143* (2013.01);
(Continued)

(58) Field of Classification Search
CPC ............ G02B 27/0172; G02B 27/0176; G02B 2027/0178; G02B 2027/0138; G02B 2027/014; G02B 2027/0154; G02B 2027/0143; G02B 5/3016
See application file for complete search history.

(56) References Cited

U.S. PATENT DOCUMENTS 6,522,474 B2 * 2/2003 Cobb ................. G02B 27/0172
359/630
2007/0024981 A1 2/2007 Duncan et al.
(Continued)

FOREIGN PATENT DOCUMENTS

KR 10-2002-0035627 A 5/2002
KR 10-2018-0095903 A 8/2018

*Primary Examiner* — Brent D Castiaux
(74) *Attorney, Agent, or Firm* — Birch, Stewart, Kolasch & Birch, LLP

(57) ABSTRACT

Disclosed is an electronic device. In the electronic device according to the present invention, a display panel disposed to emit light in a gravity direction, a concave mirror positioned below the display panel, and a polarizer positioned between the display panel and the concave mirror are used and the polarizer includes a cholesteric liquid crystal, thereby securing a visible distance and miniaturizing a size and a volume of the entire electronic device when a user wears the electronic device. The electronic device according to the present invention may be associated with an artificial intelligence module, a robot, an augmented reality (AR) device, a virtual reality (VR) device, a device related to a 5G service, and the like.

14 Claims, 19 Drawing Sheets

(52) U.S. Cl.
CPC .......... *G02B 2027/0154* (2013.01); *G02B 2027/0178* (2013.01)

(56) References Cited

U.S. PATENT DOCUMENTS

| | | | |
|---|---|---|---|
| 2013/0163090 A1* | 6/2013 | Yu | A63F 13/213 |
| | | | 359/630 |
| 2015/0219899 A1 | 8/2015 | Mack et al. | |
| 2015/0378074 A1* | 12/2015 | Kollin | G02B 5/3016 |
| | | | 349/185 |
| 2016/0278695 A1* | 9/2016 | Wang | G02B 23/2461 |
| 2017/0153450 A1 | 6/2017 | Ishii | |
| 2017/0153672 A1* | 6/2017 | Shin | G06F 1/1698 |

\* cited by examiner

[Fig. 1]
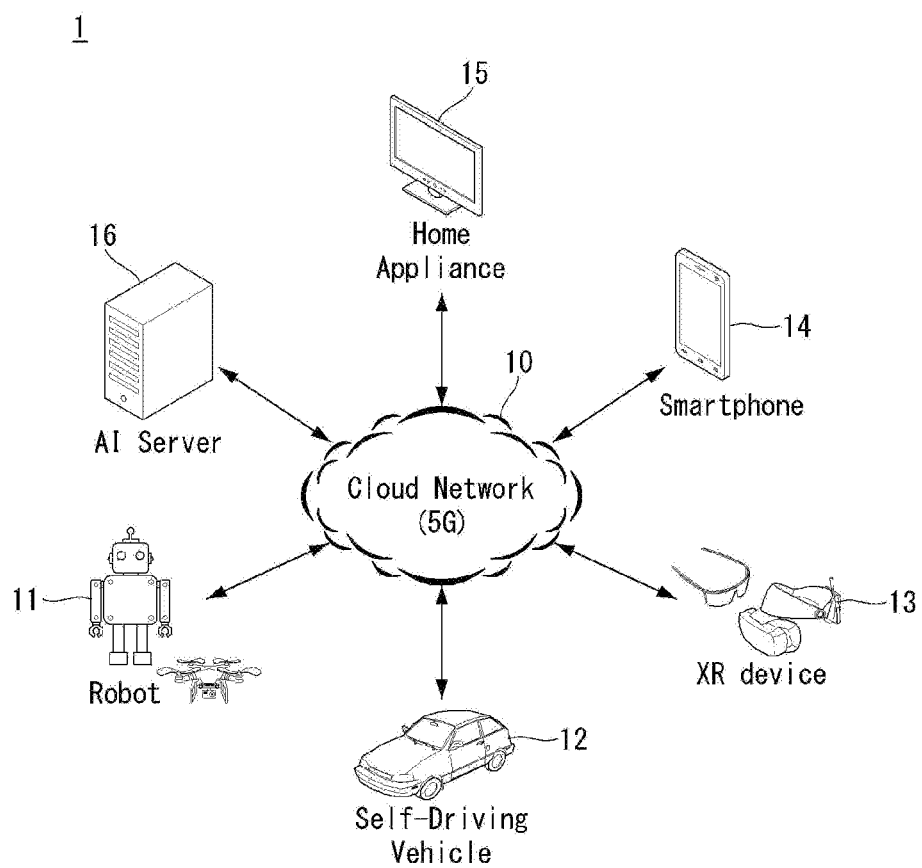

[Fig. 2]
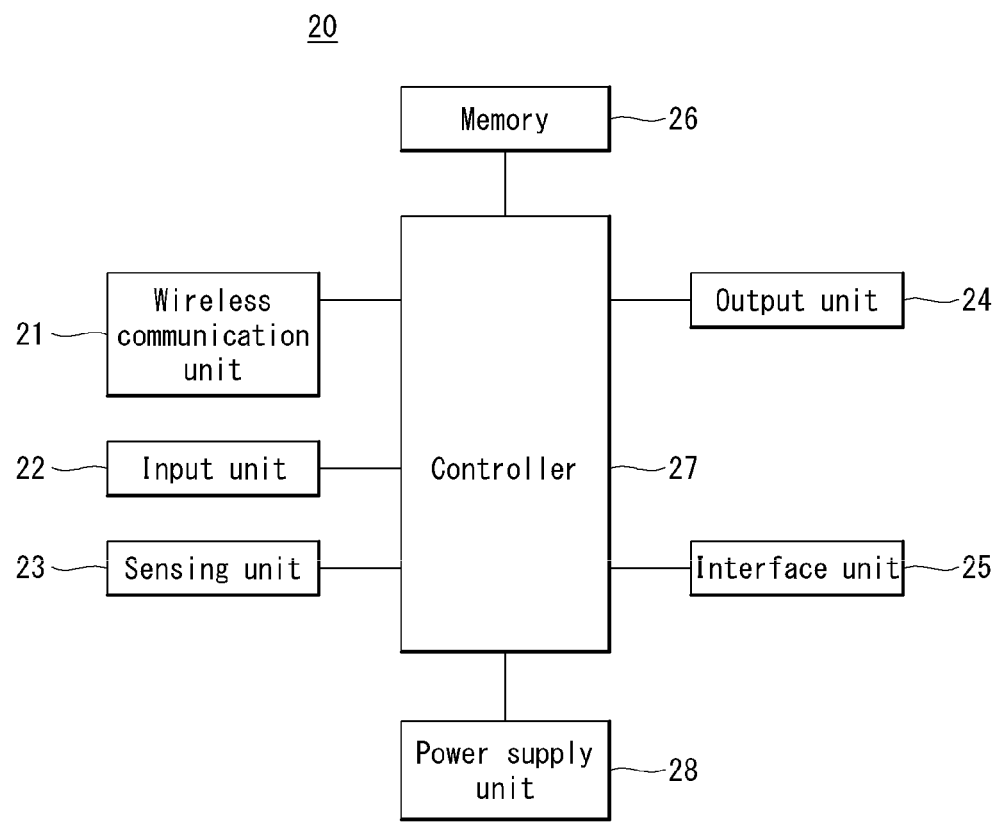

[Fig. 3]
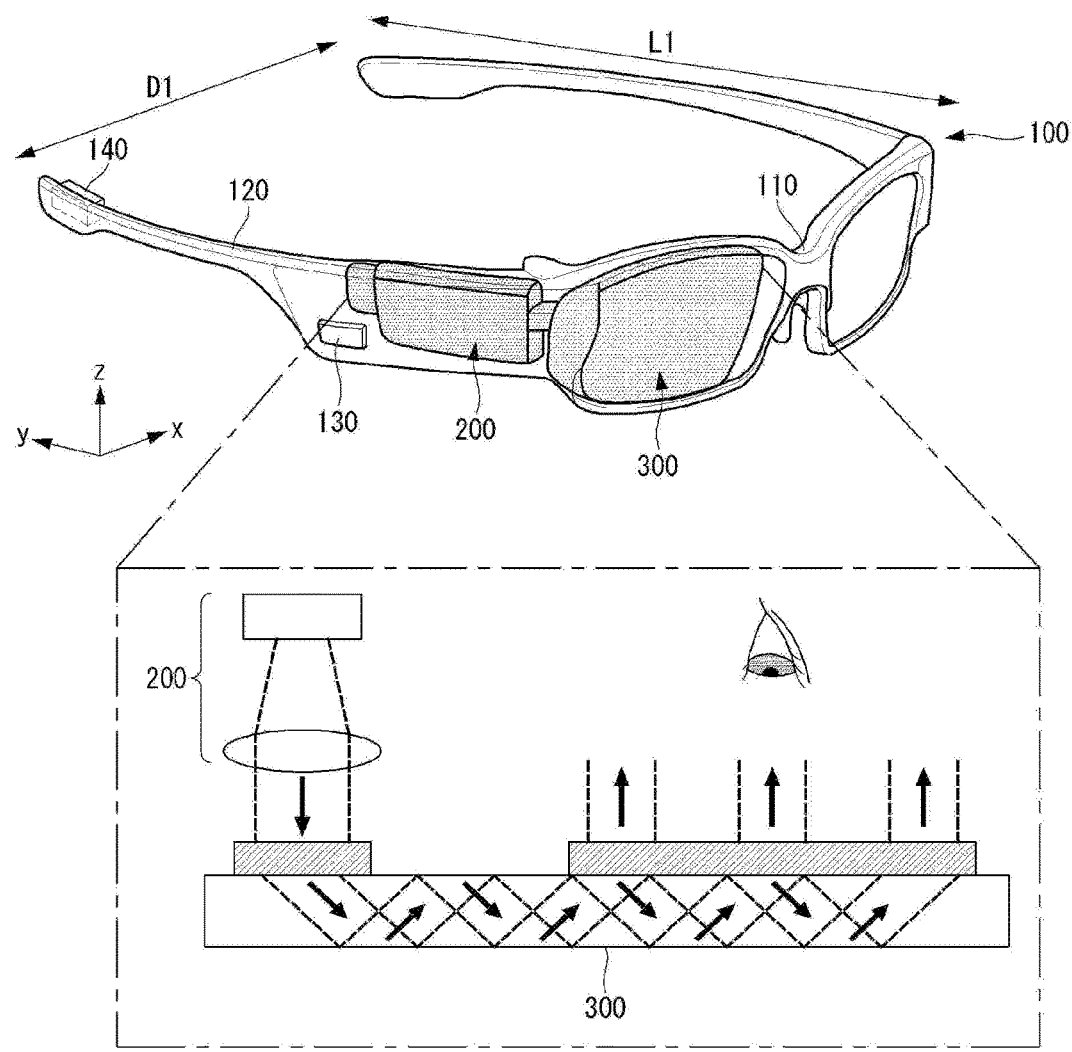

[Fig. 4]
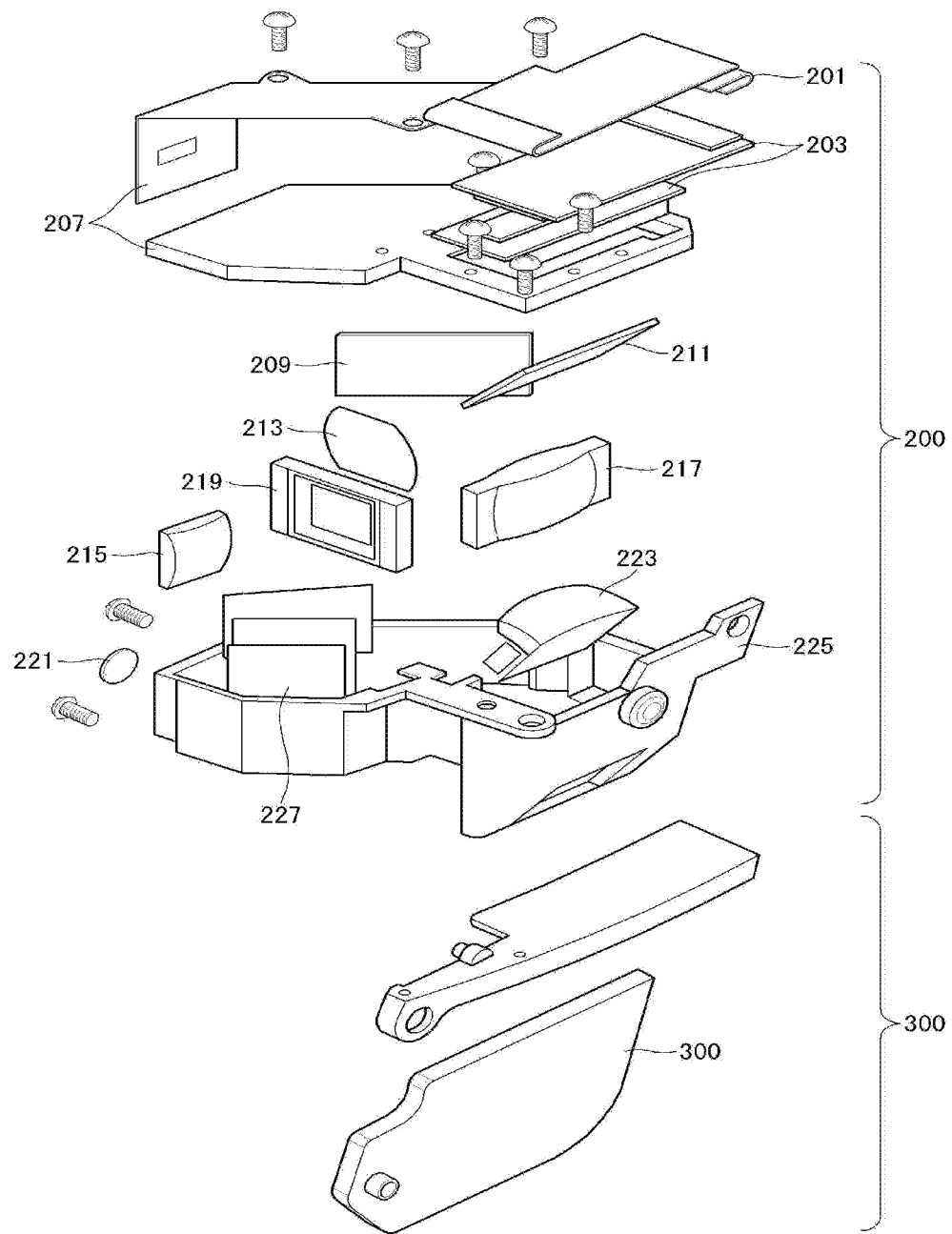

[Fig. 5]
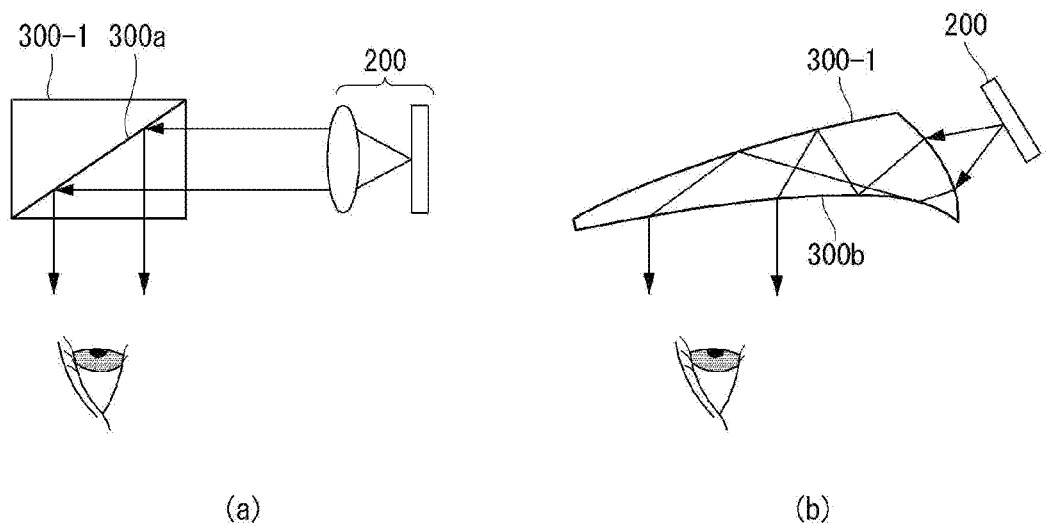
(a)  (b)

[Fig. 6]
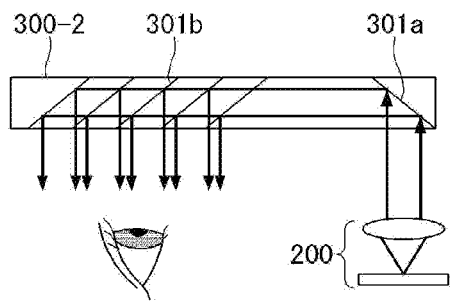
(a)
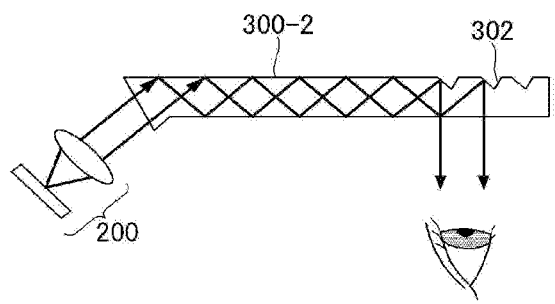
(b)
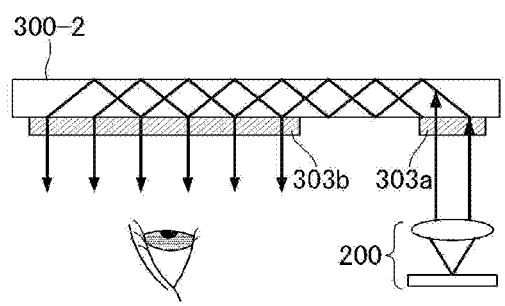
(c)
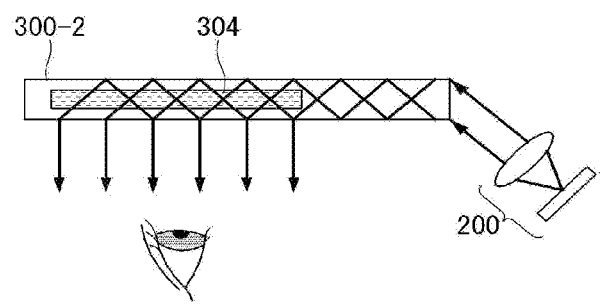
(d)
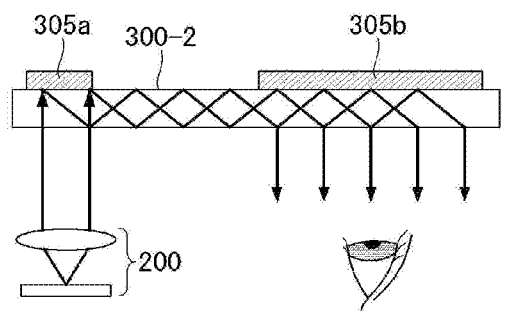
(e)
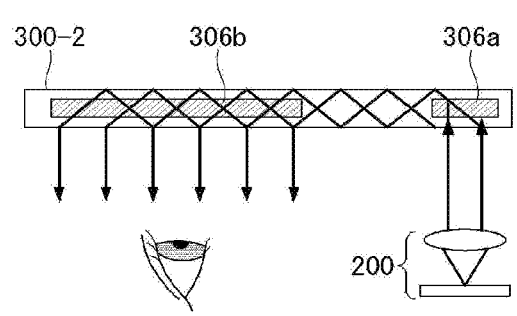
(f)

[Fig. 7]
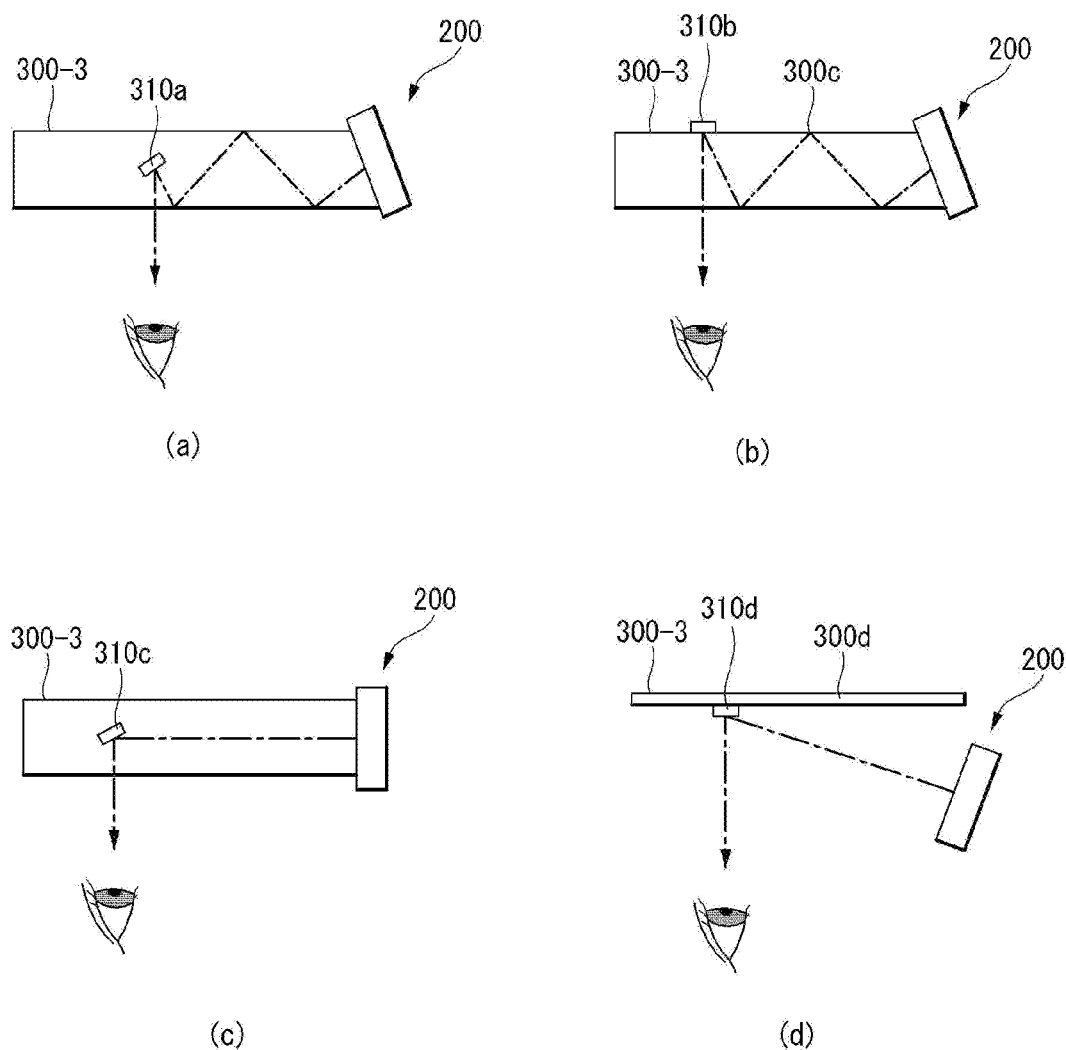

[Fig. 8]
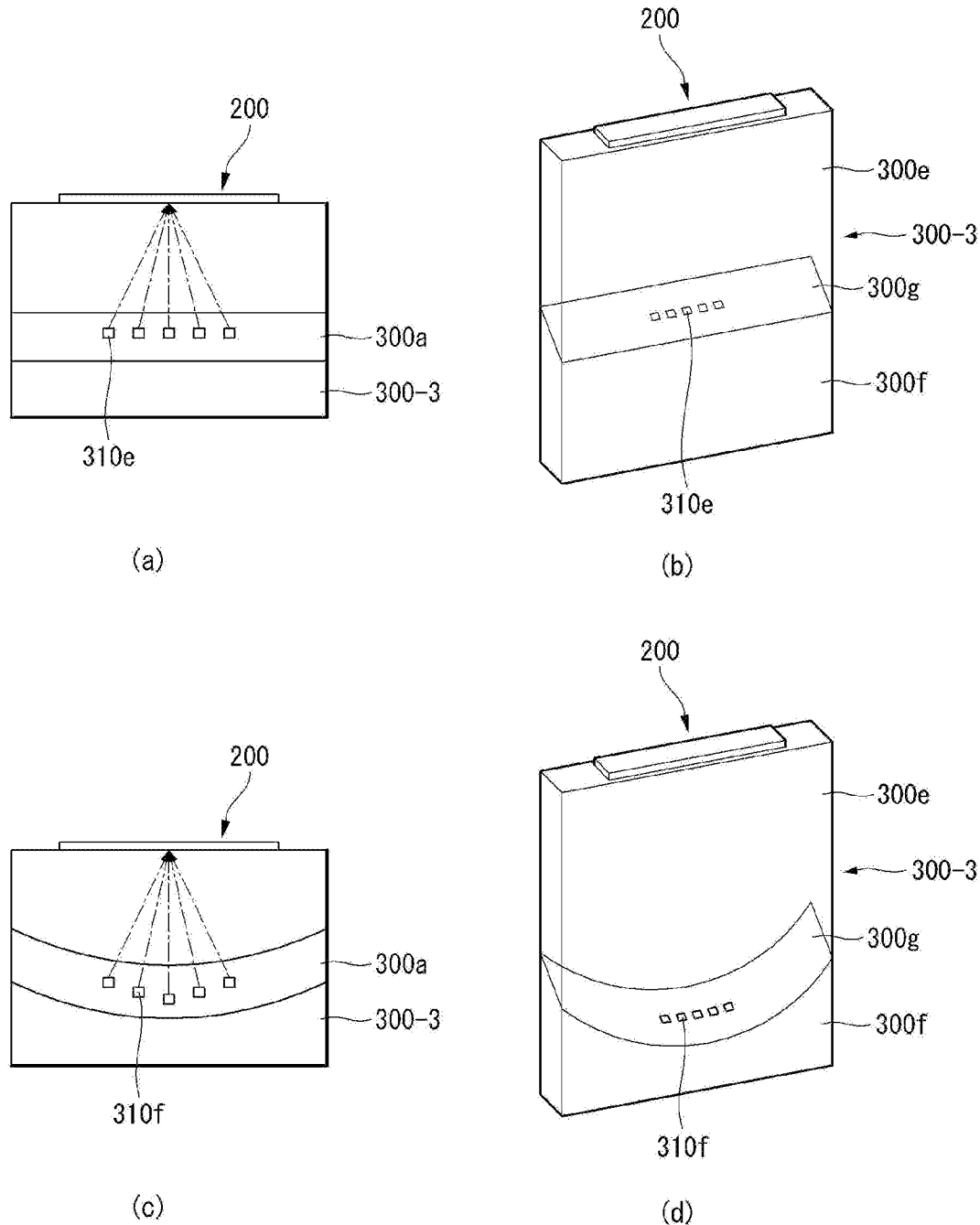

[Fig. 9]
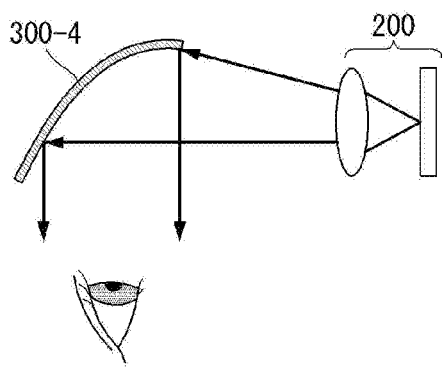
(a)
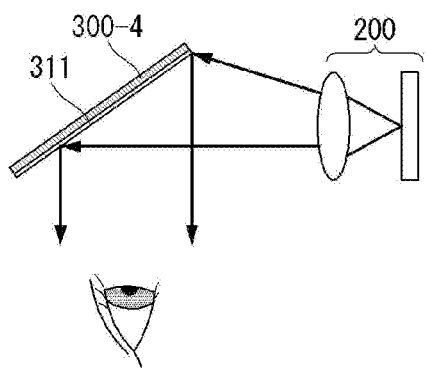
(b)
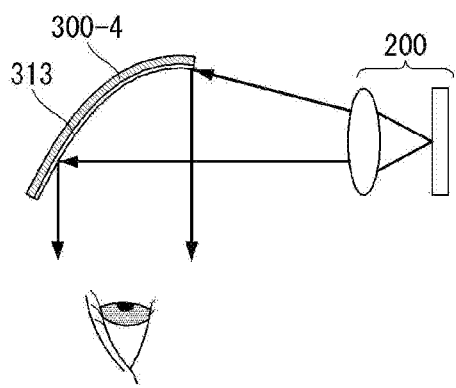
(c)

[Fig. 10]
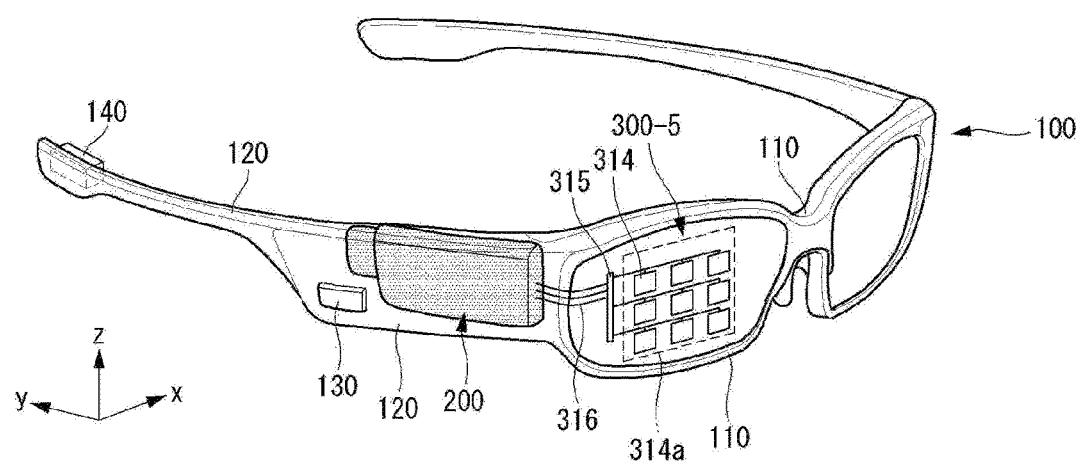

【Fig. 11】
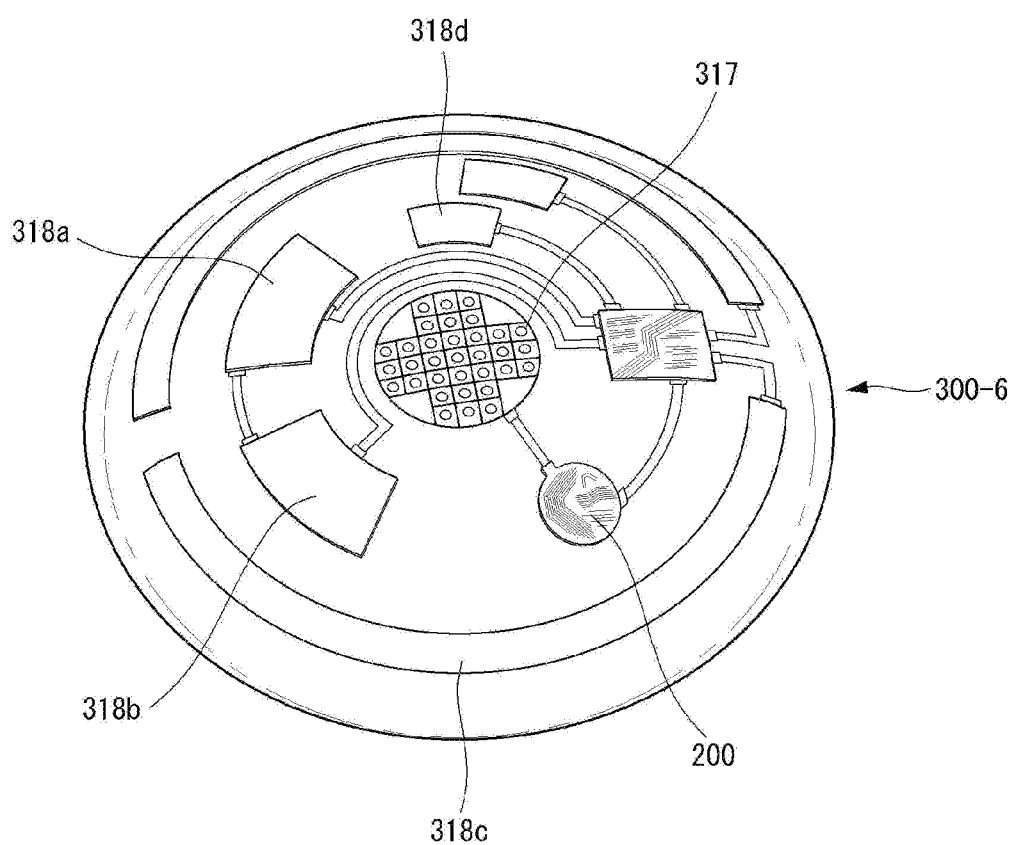

[Fig. 12]
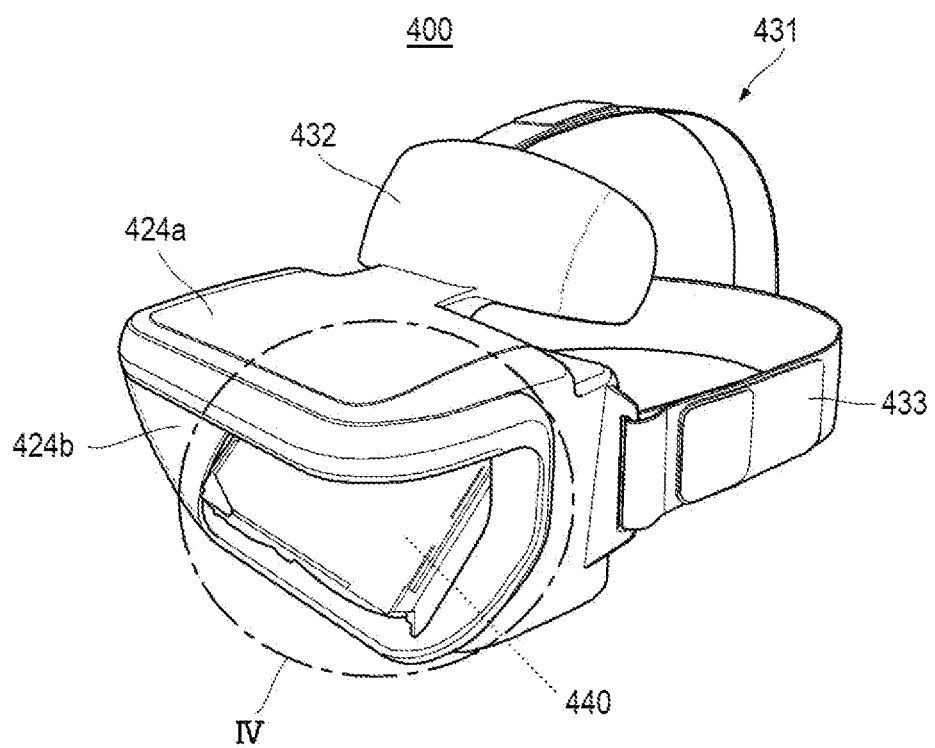

[Fig. 13]
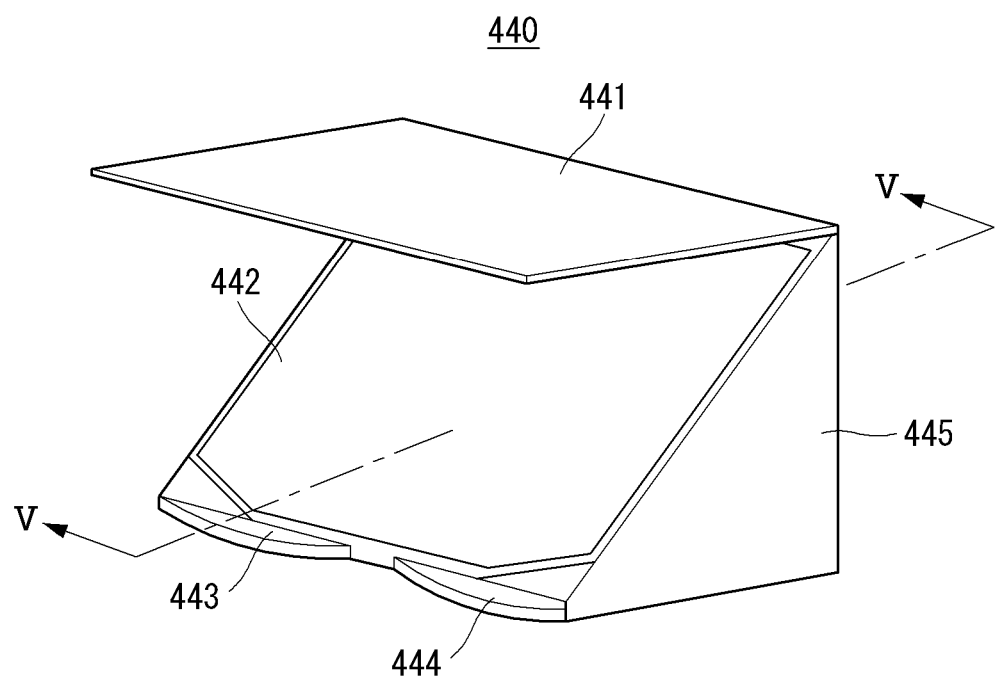

[Fig. 14]
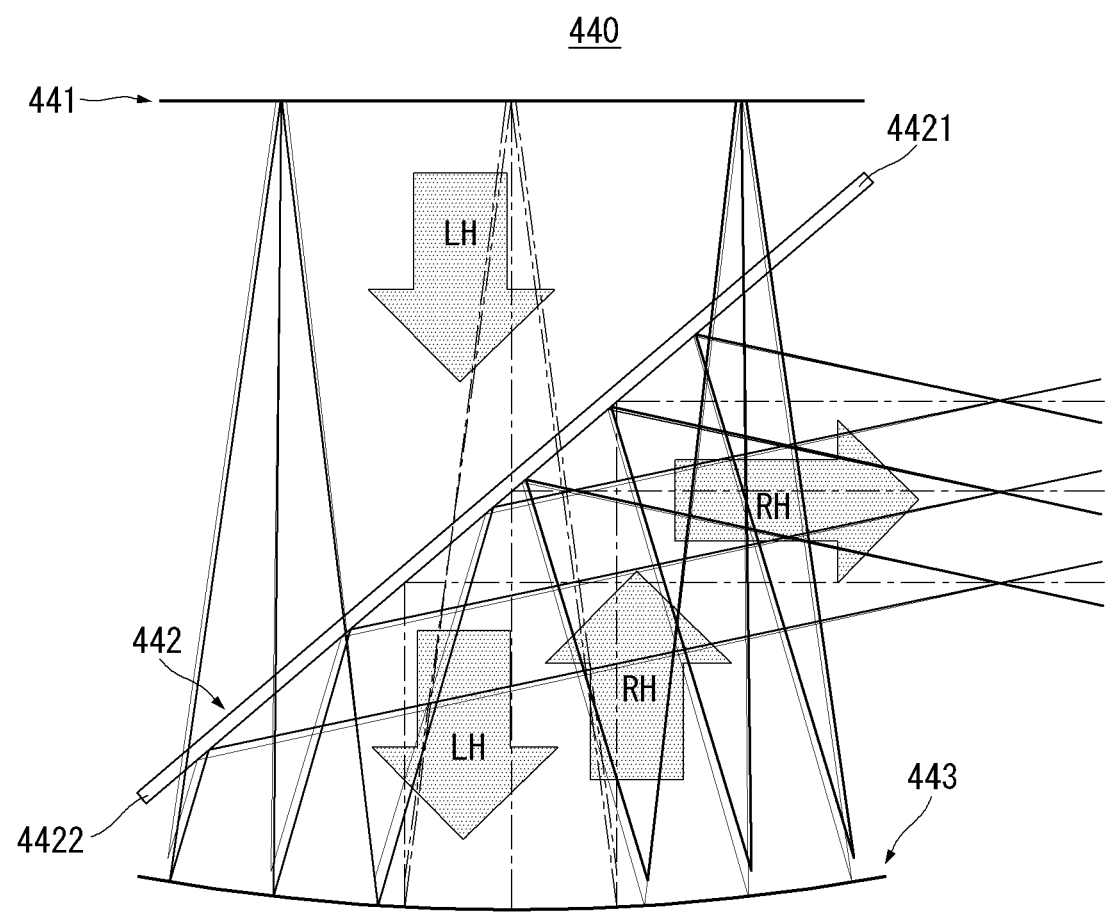

[Fig. 15]
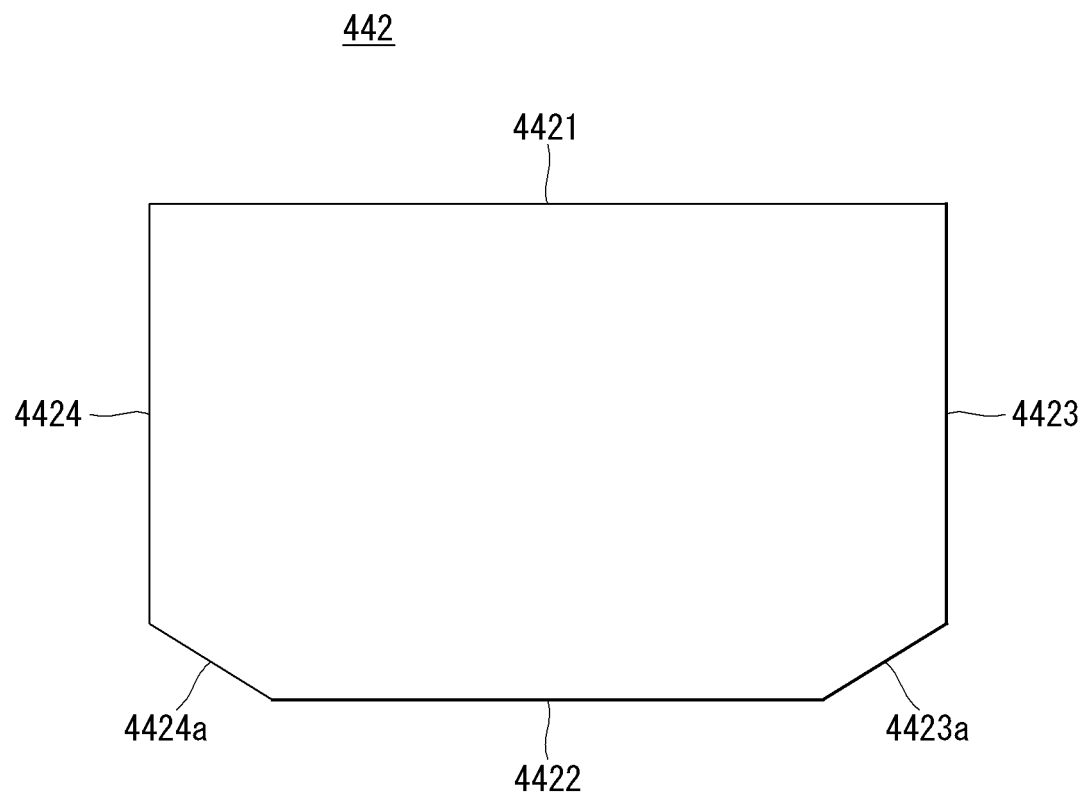

[Fig. 16]
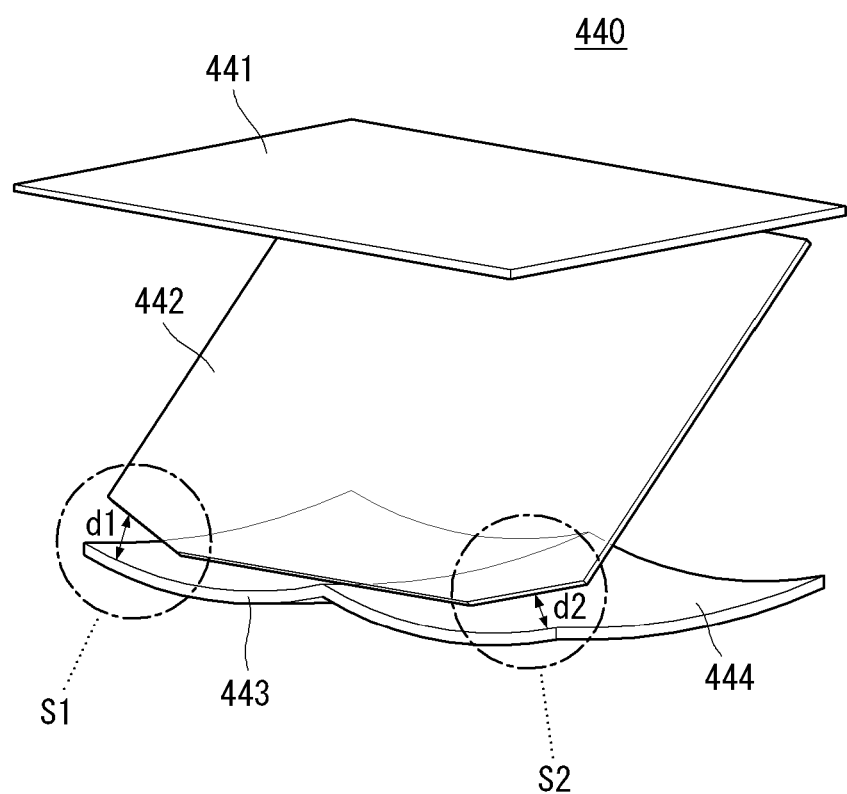

[Fig. 17]
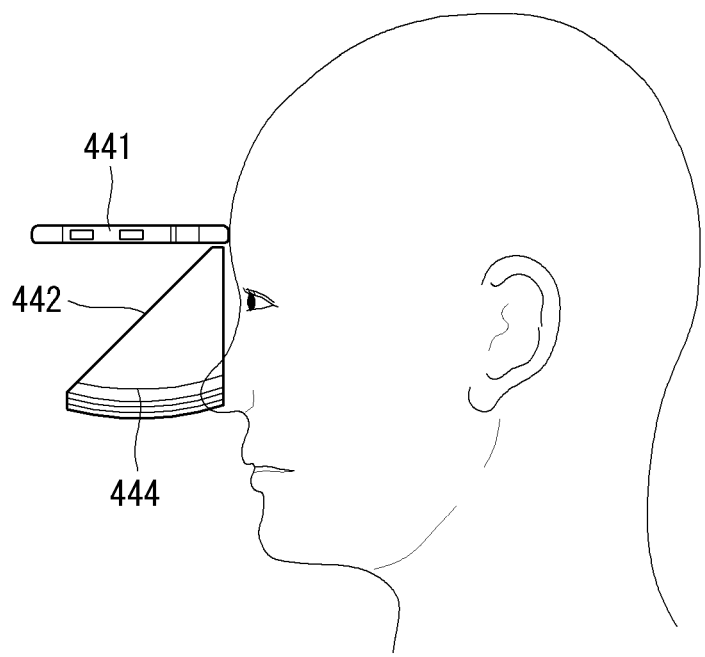
[Fig. 18]
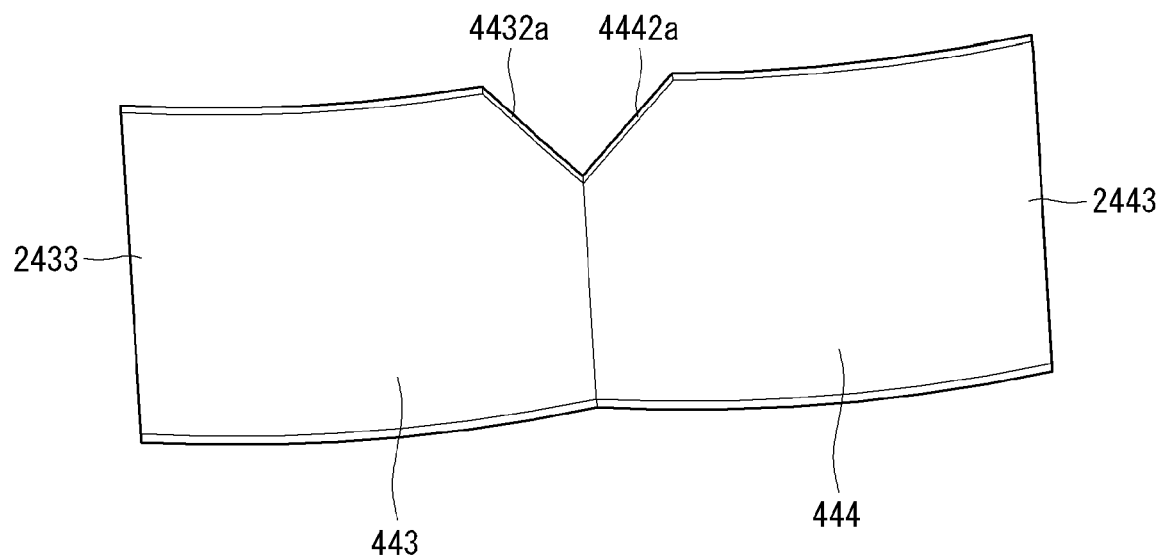

[Fig. 19]
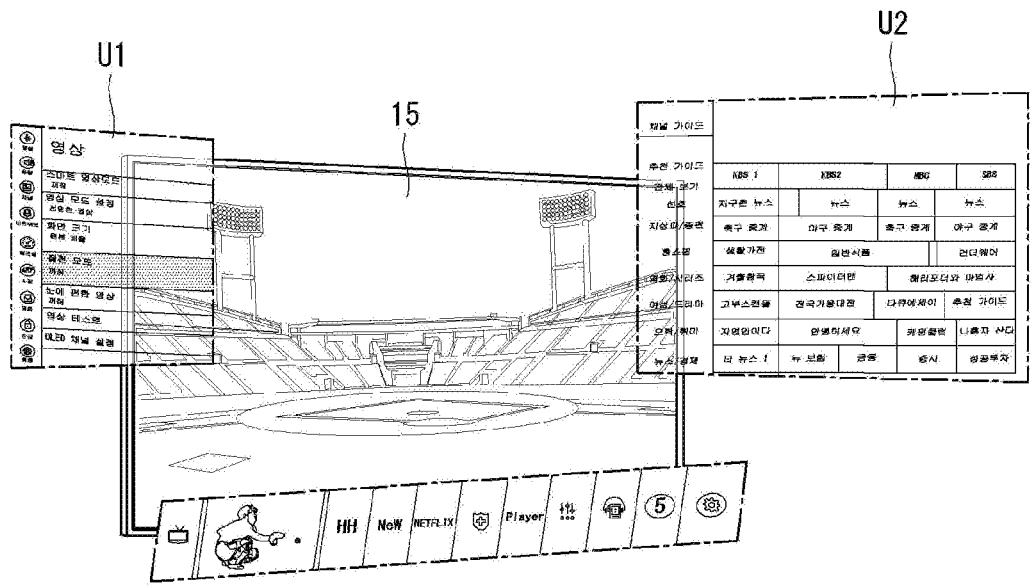
[Fig. 20]
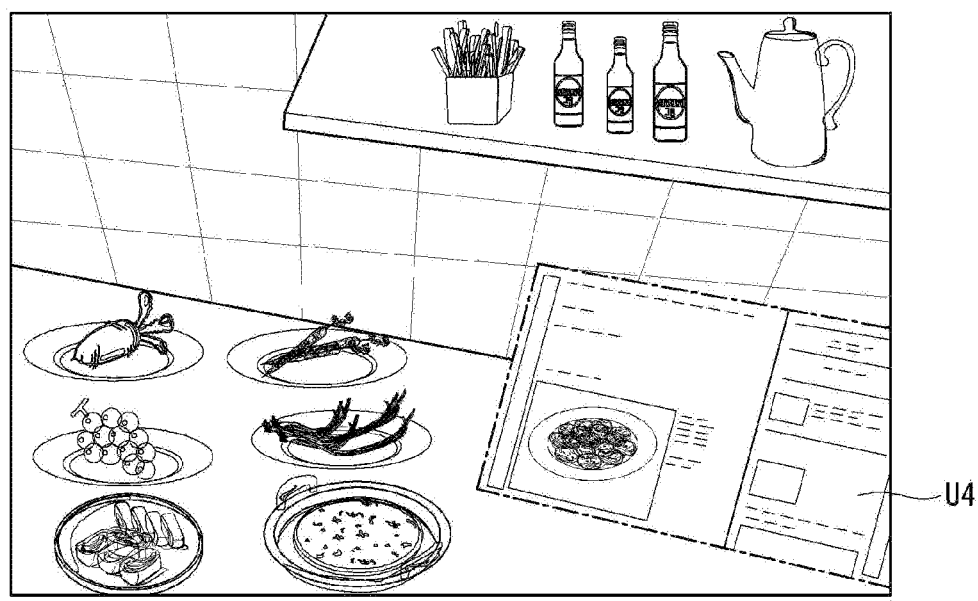

【Fig. 21】

ELECTRONIC DEVICE HAVING A DISPLAY MODULE

CROSS REFERENCE TO A RELATED APPLICATION

This application is the National Phase of PCT/KR2019/010426 filed on Aug. 16, 2019, which is hereby expressly incorporated by reference into the present application.

FIELD OF THE INVENTION

The present invention relates to an electronic device including a display module, and more particularly, to a head mounted display (HMD) having a see-through function used for an augmented reality.

BACKGROUND ART

Augmented reality (AR) refers to technology that combines a virtual object or information with a real environment to make it look like an object in an original environment.

In this case, a created virtual environment or situation stimulates five senses of a user and makes spatial and temporal experiences similar to the reality, thereby making the user freely enter a boundary between the reality and imagination. Further, the user is capable of interacting with objects implemented in such an environment, such as giving an operation or a command by using a device which actually exists in addition to immersion in such an environment.

In recent years, a research into a gear used in such a technical field has been actively conducted.

As the equipment mainly used for AR, HMD refers to various digital devices that allow visually viewing multimedia contents provided by wearing a display device on a head, such as glasses or a helmet.

Accordingly, the HMD generally includes a display module that implements an image. For example, the display module may include a liquid crystal panel including liquid crystals and an OLED panel including an organic light emitting element. Further, the display panel may further include an eyepiece and a mounting member for aligning the eyepiece with an eyeball of a user in order to allow the user to view the image implemented by the display module with eyes.

The HMD is a device that is assumed to be mounted on a head by the user and there has been a continuous need for weight reduction and miniaturization of the device itself.

Further, since the user should be able to view multimedia contents represented on the display module of the HMD together with an actual surrounding environment while wearing the HMD, the display module needs to provide visibility so as for the user to recognize a surrounding object in addition to displaying the multimedia contents.

To this end, the display module displayed in the HMD has been recently implemented to have a see-through function. For example, the user is allowed to view the surrounding object and environment with the eyes simultaneously with displaying a graphic user interface (GUI) to the user by using a half-mirror between the display panel mounted on the display module and the eyepiece.

However, in the HMD in the related art, which adopts the half-mirror, the half-mirror causes an image distortion or transmittance deterioration phenomenon while absorbing or distorting light transferred from an actual object. Further, a visible distance of the HMD user is also shortened.

In particular, when the visible distance of the user wearing the HMD is reduced, there may be a problem in the safety of the user. Therefore, in order to overcome the problem, an HMD in which a concave half-mirror is added to the display module in the related art is provided.

However, in this case, two half-mirrors are applied, resulting in more image distortion and transmittance deterioration as compared with the HMD in the related art. Further, as two half-mirrors are applied, there is also a problem in that a structure of the HMD becomes complicated and a volume and a weight increase.

SUMMARY OF THE INVENTION

An object of the present invention is to meet the needs and solve the problems.

An object of the present invention is to provide an electronic device for widening a visible distance of a user when the user uses an electronic device used for virtual reality (VR), augmented reality (AR), mixed reality (MR), etc.

An object of the present invention is to provide an electronic device which has a simple structure and is miniaturized when the user uses an electronic device used for virtual reality (VR), augmented reality (AR), mixed reality (MR), etc.

Technical Solution

According to an embodiment of the present invention, an electronic device includes a display module, in which the display module includes a display panel disposed to emit light in a gravity direction, a concave mirror positioned below the display panel, a polarizer positioned between the display panel and the concave mirror, and a first frame supporting the display panel, the concave mirror, and the polarizer, and the polarizer includes a cholesteric liquid crystal.

The polarizer may be disposed to form an angle of 45 degrees with the display panel.

In the polarizer, an upper portion disposed close to the display panel may be disposed closer to an eyeball of the user than a lower portion disposed close to the concave mirror.

The polarizer may further include first and second chamfering portions formed at both corners of the lower portion disposed close to the concave mirror, respectively.

The polarizer may be formed to transmit left-handed light among the light emitted from the display panel and reflect right-handed light reflected on the concave mirror.

In the polarizer, an upper surface facing the display panel may be subjected to anti-reflection treatment and a cholesteric liquid crystal thin-film layer may be stacked on a lower surface facing the concave mirror.

The concave mirror may include first and second concave mirrors corresponding to left and right eyes of the user, respectively, and one side of the first concave mirror and the other side of the second concave mirror may be connected to each other.

Third and fourth chamfering parts may be formed at one side of the first concave mirror and the other side of the second concave mirror and when one side of the first concave mirror and the other side of the second concave mirror are connected to each other, the third and fourth chamfering parts may face each other.

The electronic device may further include a main frame accommodating the display module therein and equipped with a visor and an eyepiece transmitting the light so as for the user to recognize a surrounding object and a surrounding environment, and the polarizer may be positioned between the visor and the eyepiece.

According to an embodiment of the present invention, the electronic device may further include a head part connected to the main frame, in which the head part may further include a head rest covering a head of the user, and a band of which length is adjustable according to the size of the head of the user.

According to an embodiment of the present invention, the electronic device may further include: a sensing part sensing an external digital device; a device to device communication module allowing data transmission/reception between the external digital device sensed by the sensing part and the electronic device; a processor classifying, when receiving information on the external digital device through the device to device communication module, the information to be displayed in the display module; and a memory storing data for operating the electronic device, in which the processor classifies the information with a graphic user interface prestored in the memory to display the classified information in the display module.

According to an embodiment of the present invention, the electronic device may further include an input part receiving an input of the user, in which when the input of the user is received through the input part, the processor may process a function corresponding to the input to be executed among functions prestored in the memory.

The input part may further include a camera or a video input part for inputting a video signal, a microphone or an audio input part for inputting an audio signal, and a user input part (e.g., a touch key, a push key (mechanical key), etc.) for receiving information from the user.

The sensing part may include at least one of a proximity sensor, an illumination sensor, a touch sensor, an acceleration sensor, a magnetic sensor, a gravity (G) sensor, a gyroscope sensor, a motion sensor, an RGB sensor, an infrared (IR) sensor, a finger scan sensor, an ultrasonic sensor, an optical sensor, a microphone, a battery gauge, an environment sensor including a barometer, a hygrometer, a thermometers, radiation sensor, a heat sensor, a gas sensor, and chemical sensors including an electronic nose, a healthcare sensor, and a biometric sensor.

According to an embodiment of the present invention, the electronic device may further include at least one of a broadcasting module, a mobile communication module, a wireless Internet module, a short-range communication module, and a position module.

Advantageous Effects

According to the present invention, in an electronic device, a polarizer is inclined and a concave mirror is disposed below the polarizer to secure a visual axis of a user, thereby increasing a visible distance of the user by 2 times compared with the related art.

In the electronic device according to the present invention, since a half-mirror in which each of reflectance and transmittance is half is not used, light efficiency used in the electronic device is greatly enhanced.

Further, in the electronic device according to the present invention, distortion and chromatic aberration can be minimized by using a concave mirror of which optimal design is easy in terms of a size and a volume and an image distortion phenomenon can be prevented.

In the electronic device according to the present invention, a see-through effect is maximized in that the concave mirror is disposed perpendicular to a visual axis viewed by a user to secure a visible distance through a polarizer.

In the electronic device according to the present invention, since an HMD can be implemented by using only one polarizer and one concave mirror, the size and the volume can be further decreased.

BRIEF DESCRIPTION OF THE DRAWINGS

FIG. 1 is a conceptual diagram illustrating an embodiment of a 5G network environment in which heterogeneous electronic devices are connected to a cloud network.

FIG. 2 is a block diagram illustrating a configuration of an electronic device including a display module according to an embodiment of the present invention.

FIG. 3 is a perspective view of an augmented reality electronic device according to an embodiment of the present invention.

FIG. 4 is an exploded perspective view for describing a control unit according to an embodiment of the present invention.

FIG. 5 is a diagram for describing an embodiment of a prism scheme optical element.

FIG. 6 is a diagram for describing an embodiment of a waveguide scheme optical element.

FIGS. 7 and 8 are diagrams for describing an embodiment of a pin mirror scheme optical element.

FIG. 9 is a diagram for describing an embodiment of a surface reflection scheme optical element.

FIG. 10 is a diagram for describing an embodiment of a micro LED scheme optical element.

FIG. 11 is a diagram for describing an embodiment of a display unit used for a contact lens.

FIG. 12 is a perspective view illustrating an HMD in which an electronic device is implemented according to an embodiment of the present invention.

FIG. 13 is an enlarged view of line XIII of FIG. 12.

FIG. 14 is a diagram illustrated taken along line XIV of FIG. 13.

FIG. 15 is a plan view of a polarizer according to an embodiment of the present invention.

FIG. 16 is a perspective view of a display module according to an embodiment of the present invention.

FIG. 17 is a conceptual view illustrating that a display module is applied to a face of a user according to an embodiment of the present invention.

FIG. 18 is a diagram illustrating a concave mirror according to an embodiment of the present invention.

FIG. 19 is a diagram illustrating a scenario in which an electronic device and a TV are linked with each other by device to device (D2D) according to an embodiment of the present invention.

FIGS. 20 and 21 are diagrams illustrating a scenario in which an electronic device according to an embodiment of the present invention provides information on an object which appears in a TV video when a user watches the TV video.

DETAILED DESCRIPTION OF EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

Suffixes "module" and "unit" for components used in the following description are given or mixed in consideration of easy preparation of the specification only and do not have their own distinguished meanings or roles. Further, in describing the embodiment disclosed in this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

The terms "first", "second", etc. may be used to describe various components, but the components are not limited by such terms. The terms are used only for the purpose of distinguishing one component from other components. For example, a first component may be designated as a second component, and vice versa, without departing from the scope of the present invention.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements. On the other hand, when a constituting element is said to be "directly connected" or "directly connected" to other constituting element, it should be understood that there is no other constituting element in between.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may disappear. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The display device including the display module according to present invention to be described below may be implemented by combining or modifying the respective embodiments to satisfy the aforementioned requirements of the 5G system.

[Scenario in which the 5G Network and the Present Invention are Linked]

FIG. 1 is a conceptual diagram illustrating an embodiment of a 5G network environment in which different types of electronic devices are connected to a cloud network 10.

Referring to FIG. 1, the AI system is implemented as an AI server 16, and is connected to at least one of a robot 11, self-driving vehicle 12, XR device 13, smartphone 14 and home appliance 15. Here, the robot 11, self-driving vehicle 12, XR device 13, smartphone 14, or home appliance 15 that are connected through AI server 16 and the cloud network 10 may be referred to as a the cloud A robot 11, cloud AI self-driving vehicle 12, cloud AI XR device 13, cloud AI smartphone 14, or cloud AI home appliance 15.

The AI server 16 may include a server that performs AI processing and a server that performs operations on big data.

However, the robot 11, self-driving vehicle 12, XR device 13, smartphone 14 or home appliance 15 may include an AI system including an AI processor and an AI server role, as on-premises.

In this case, the AI robot 11, AI self-driving vehicle 12, AI XR device 13, AI smartphone 14 or AI home appliance 15 may be referred to.

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 15 and 20) connected to the cloud network 10 and connected to each other may communicate with each other through the eNB but may communicate directly to each other without relying on the eNB.

The AI server 16 may be connected to at least one or more of the robot 11, self-driving vehicle 12. XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (1 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

The XR device 13 may be connected through the A server 16 and the cloud network 10 and may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

Here, XR is extended Reality and refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The electronic device 20 including the display module according to the present invention will be described with an example of being implemented as the XR device 13 among the above-described devices. In particular, for convenience of description of the present invention, the electronic device 20 including the display module according to the present invention will be described as an example of being implemented as an AR device among the XR devices 13 described above.

Hereinafter, an electronic device 20 including a display module according to an exemplary embodiment of the present invention will be described with reference to FIG. 2.

FIG. 2 is a block diagram illustrating the structure of an XR electronic device 20 including a display module according to one embodiment of the present invention.

Referring to FIG. 2, the XR electronic device 20 including a display module may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more device to device communication modules which enable wireless communication between the electronic device 20 and a wireless communication system, between the electronic device 20 and other electronic device, or between the electronic device 20 and an external server. Also, the wireless communication unit 21 may include one or more network communication modules that connect the electronic device 20 to one or more networks.

The wireless communication unit 21 may include at least one of a broadcast receiving module, mobile communication module, wireless Internet module, short-range communication module, and location information module as the communication module and the network communication module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 according to the present invention and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display module 240, sound output unit, haptic module, and optical output unit.

The display module 240 may include a display unit for displaying a virtual image or an image in front of the user's eyes, and the display unit may form a mutual layer structure or integrally with the touch sensor to implement a touch screen. Such a touch screen can function as a user input means for providing an input interface between the electronic device 20 and the user, and can also provide an output interface between the electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20 and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above. To this end, the controller 27 may include a processor.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device 20 according to various embodiments described below. Also, the operation, control, or control method of the electronic device 20 may be implemented on the electronic device by executing at least one application program stored in the memory 26.

FIG. 3 is a perspective view of an AR electronic device according to one embodiment of the present invention.

As shown in FIG. 3, the electronic device 20 according to one embodiment of the present invention may include a frame 10, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 3, the electronic device may operate so that if the controller 200 projects light about an image onto one side of the display unit 300, the light is emitted to the other side of the display unit, and the image generated by the controller 200 is shown to the user.

Accordingly, the user can seethe image generated by the controller 200 while seeing the external environment simultaneously through the opening of the frame 100. In other words, the image output through the display unit 300 can be seen by being overlapped with a normal view. By using the display characteristic described above, the electronic device may provide an AR experience which shows a virtual image overlapped with a real image or background as a single, interwoven image.

FIG. 4 is an exploded perspective view of a controller according to one embodiment of the present invention.

Referring to the figure, the controller 200 may include a first cover 207 and second cover 225 for protecting internal constituting elements and forming the external appearance of the controller 200, where, inside the first cover 207 and the second 225 cover, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 5 to 11 illustrate various display methods applicable to the display unit 300 according to one embodiment of the present invention.

More specifically, FIG. 5 illustrates one embodiment of a prism-type optical element; FIG. 6 illustrates one embodiment of a waveguide-type optical element; FIGS. 7 and 8 illustrate one embodiment of a pin mirror-type optical element; and FIG. 9 illustrates one embodiment of a surface reflection-type optical element. And FIG. 10 illustrates one embodiment of a micro-LED type optical element, and FIG. 11 illustrates one embodiment of a display unit used for contact lenses.

As shown in FIG. 5, the display unit 300-1 according to one embodiment of the present invention may use a prism-type optical element.

In one embodiment, as shown in FIG. 5(a), a prism-type optical element may use a flat-type glass optical element where the surface 300a on which image light rays are incident and from which the image light rays are emitted is planar or as shown in FIG. 5(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 6, the display unit 300-2 according to another embodiment of the present invention may use a waveguide-type optical element or light guide optical element (LOE).

As one embodiment, the waveguide or light guide-type optical element may be implemented by using a segmented beam splitter-type glass optical element as shown in FIG. 6(a), saw tooth prism-type glass optical element as shown in FIG. 6(b), glass optical element having a diffractive optical element (DOE) as shown in FIG. 6(c), glass optical element having a hologram optical element (HOE) as shown in FIG. 6(d), glass optical element having a passive grating as shown in FIG. 6(e), and glass optical element having an active grating as shown in FIG. 6(f).

As shown in FIG. 6(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 6(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 6(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 6(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 6(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 6(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 7 and 8.

Referring to FIG. 7(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 7(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 7(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 7(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 8 illustrates the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 8(a) and (b) illustrate the Flat Pin Mirror scheme, and FIGS. 8(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 8(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 8(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 9(a). Flat HOE method as shown in FIG. 9(b), and freeform HOE method as shown in FIG. 9(c).

The surface reflection-type optical element based on the freeform combiner method as shown in FIG. 9(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 9(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 9(c) may have a HOE 313 coated or patterned on the surface of freeform glass, where the operating principles may be the same as described with reference to FIG. 9(b).

In addition, a display unit 300-5 employing micro LED as shown in FIG. 12 and a display unit 300-6 employing a contact lens as shown in FIG. 13 may also be used.

Referring to FIG. 10, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD) and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 11, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present invention may include a retina scan method.

Hereinafter, the electronic device according to the present invention will be described in more detail with reference to FIGS. 12 to 18.

In FIGS. 12 to 18, the electronic device will be described based on an embodiment in which the electronic device according to the present invention is applied to a head-mounted display (HMD). Therefore, hereinafter, an electronic device 20 according to the present invention will be described by defining the electronic device 20 as an HMD 400.

However, a detailed embodiment of the electronic device according to the present invention may include a cellular phone, a smart phone, a laptop computer, a digital broadcasting terminal, a personal digital assistants (PDA), a portable multimedia player (PMP), a navigation, a slate PC, a tablet PC, an ultrabook, and a wearable device. The wearable device may include a smart watch in addition to the HMD. Further, as necessary, hereinafter, the terms electronic device 20 and HDM 400 may be mixedly used.

FIG. 12 is a perspective view illustrating an HMD in which an electronic device is implemented according to an embodiment of the present invention, FIG. 13 as an enlarged view of line XIII of FIG. 12 is a diagram illustrating a configuration of a display module according to an embodiment of the present invention, and FIG. 14 as a diagram illustrated taken along line XIV of FIG. 13 is a cross-sectional view of a display module according to an embodiment of the present invention. FIG. 15 is a plan view of a polarizer according to an embodiment of the present invention. FIG. 16 is a perspective view of a display module according to an exemplary embodiment, FIG. 17 is a conceptual view illustrating that a display module is applied to a face of a user according to an embodiment of the present invention, and FIG. 18 is a diagram illustrating a concave mirror according to an embodiment of the present invention.

First, referring to FIG. 12, the HMD 400 includes a head unit 431 worn and supported on a head of a human body, a main frame 424a coupled to the head unit 431, and a display module 440 mounted inside the main frame 424a and displaying a virtual image or video in front of an eye of a user.

Since the display module 440 includes a display panel (also referred to as a display panel) 441 and a polarizer 442 which are vulnerable to shock, the display module 440 is mounted inside the main frame 424a to be protected from external shock. In the drawing, it is illustrated that the head unit 431, the main frame 424a, and the display module 440 are coupled to each other as separate components, but all of the head unit 431, the main frame 424a, and the display module 440 may be integrally configured.

The main frame 424a may be called a cover unit and may have a tub shape in overall. Since a space is formed in the main frame 424a, various components may be mounted. As illustrated in FIG. 12, a display module 440 is embedded in the main frame 424a and besides, components such as a wireless communication unit 21, an input unit 22, an input unit 23, an interface unit 25, a memory 26, a control unit 27, or a power supply unit 28 may be embedded.

Further, an opening may be formed in the main frame 424a, which corresponds to a position of an eyeball of the user and eyepieces corresponding to a left eye and a right eye of the user may be mounted on the opening. A front surface of the main frame 424a may be opened and in order to allow the user to view the image and the video displayed through the display module 440 overlapped with or linked with an actual surrounding environment or object, a visor 424b may be mounted on the front surface of the main frame 424a as illustrated in FIG. 12.

Since the display module 440 includes a backlight unit, a display panel 441, a polarizer 442, and the like, the display module 440 is somewhat heavy and the head unit 431 may include a head rest 432 covering the head of the user and a band 433 of which length may vary appropriately according to a different head size for each user as illustrated in FIG. 12 in order to distribute a weight of the display module 440 applied to the head of the user. In this case, the head rest 432 may be made of a flexible material so that the user easily wears the head unit 431.

It is exemplarily illustrated that the head unit 431 illustrated in FIG. 12 is a head gear type, but the head unit 431 may be provided as a smart glass type.

Referring to FIG. 13, the display module 440 will be described in more detail. The display module 440 may be referred to as a display module and the display module 440 may include concave mirrors 443 and 444, a polarizer 442, a display panel 441, and a backlight unit (not illustrated) stacked in order from the bottom. Further, the display module 440 may include a first frame 445 for supporting the concave mirrors 443 and 444, the polarizer 442, and the display panel 441.

The display panel 441 emits light emitted from the backlight unit to the concave mirrors 443 and 444 positioned below the display panel 441 and the polarizer 442 is disposed between the display panel 441 and the concave mirrors 443 and 444 to polarize the light emitted from the display panel 441 and the light reflected from the concave mirrors 443 and 444. To this end, the polarizer 442 is disposed in an obliquely inclined from between the display panel 441 and the concave mirrors 443 and 444.

Referring to FIG. 14, when the arrangement of the polarizer 442 is described in more detail, an upper portion 4421 of the polarizer, that is, the upper portion 4421 of the polarizer disposed in close proximity to the display panel may be disposed to be inclined so as to be closer to a user eyeball e1 than a lower portion 4422 of the polarizer, that is, the lower portion 4422 of the polarizer disposed in close proximity to the concave mirrors 443 and 444. In this case, the polarizer 442 may be obliquely inclined so that each of angles between the upper display panel 441 and the lower concave mirrors 443 and 444 becomes an angle of 45 degrees.

The polarizer 442 is configured to include Cholesteric Liquid Crystal (CLC) and the polarizer 442 itself is a liquid crystal having light transmittance and is formed to transmit left-handed (LH) light among light emitted from the display panel 441 and reflect right-handed (RH) light reflected on the concave mirrors 443 and 444.

More specifically, an upper surface of the polarizer 442 facing the display panel 441 is subjected to anti-reflection (AR) treatment to maintain high light transmittance, and as a result, the light emitted from the display panel 441 penetrates the polarizer 442 and propagates to the concave mirrors 443 and 444 disposed at the lower portion 4422 of the polarizer. In addition, a lower surface of the polarizer 442 facing the concave mirrors 443 and 444 is treated so that a CLC thin-film layer is stacked to reflect the right-handed light among the light reflected from the concave mirrors 443 and 444 to an eyepiece aligned with the eyeball of the user.

In other words, the light emitted from the display panel 441 is transmitted by the polarizer 442 and reflected by the concave mirrors 443 and 444 and the left-handed light on the lower surface of the polarizer 442 is absorbed by the CLC thin-film layer stacked on the lower surface of the polarizer and the right-handed light is reflected to face the eyepiece.

Accordingly, a user wearing the HMD 400, which is the electronic device including the display module 440, may view an image or a video implemented in the display module 440 through the eyepiece. In addition, since the polarize 442 included in the display module 440 has the light transmittance itself, the user may visually directly recognize an environment or an object around the HMD 400 in addition to the image or video implemented in the display module 440.

Referring to FIG. 15, the polarizer 442 according to the present invention has first and second chamfering parts 4424*a* and 4423*a* at both edges of the lower portion 4422 of the polarizer disposed in proximity to the concave mirrors 443 and 444. The first and second chambering portions 4424*a* and 4423*a* provide spaces S1 and S2 in which the first frame 445 may be disposed between the concave mirrors 443 and 444 and the lower portion 4422 of the polarizer.

The polarizer 442 should be maintained to be obliquely inclined at 45 degrees between the concave mirrors 443 and 444 and in this case, the first frame 445 illustrated in FIG. 13 serves to support the polarizer 442 to be maintained to be inclined at 45 degrees. In this case, when distances d1 and d2 between the lower portion 4422 of the polarizer and the concave mirrors 443 and 444 increase by the first frame 445, polarization efficiency or light transmittance may be lowered by the increased distances, and as a result, an image distortion phenomenon may occur and conversely, when the spaces S1 and S2 are not sufficient between the concave mirrors 443 and 444 and the lower portion 4422 of the polarizer, the first frame 445 may not support the polarizer 442 with a sufficient strength, and as a result, the polarizer 442 is separated from the first frame 445.

Accordingly, as illustrated in FIG. 16, the first and second chamfering parts 4424*a* and 4423*a* provide a spatial margin so that the lower portion 4422 of the polarizer maintains a close distance to the concave mirrors 443 and 444 and simultaneously, the first frame 445 sufficiently supports the lower portion 4422 of the polarizer. The spatial margin preferably becomes approximately 1 mm.

Meanwhile, for convenience of description and intuitive understanding in the present invention, since the first and second chamfering parts 4424*a* and 4423*a* are merely expressed chamfering parts, a shape of the chamfering part need not particularly be limited to a diagonal line as illustrated, in FIG. 15 and all shapes of the chamfering part may be used, which the lower portion 4422 of the polarizer maintains the close distance to the concave mirrors 443 and 444 while providing the sufficient space to the first frame 445.

Further, it is described that the first and second chamfering parts 4424*a* and 4423*a* are formed at corner portions connected to one side and the other side 4424 and 4423 of the polarizer, but if the chamfering part does not interfere with the light transmitted by the polarizer or the light incident on the polarizer, it is not limited that the chambering portion is formed at the center of the lower portion 4422 of the polarizer.

Referring to FIG. 17, when the face of the user is viewed from the side, a nose of the user a portion protruding from the face and when the user wears the HMD 400 at a position corresponding to an orbital portion, the HMD 400 needs to have a space to accommodate the nose of the user. In addition, when the left eye and the right eye of the user are separated from each other by a predetermined distance, a binocular disparity occurs and an optical system corresponding to each of the left eye and the right eye needs to be designed in order for the user to recognize the image or video provided by the HMD 400 as the same image or video in spite of the binocular disparity.

To this end, as shown in FIG. 18, the concave mirrors 443 and 444 according to the present invention include first and second concave mirrors 443 and 444 corresponding to the left and right eyes of the user, respectively. The first and second concave mirrors 443 and 444 are preferably configured to be connected to each other in order to overcome the binocular disparity of the user and make the user recognize the same image or video. However, if the first and second concave mirrors 443 and 444 may make the user to recognize the same image or video in response to the left and right eyes of the user, respectively, it is not limited that the first and second concave mirrors 443 and 444 are disposed to be separated from each other.

When the first and second concave mirrors 443 and 444 are connected to each other, as illustrated in FIG. 18, one side of the first concave mirror and the other side of the second concave mirror are connected to each other, and one side of the first concave mirror means an opposite side to the other side 2433 of the first concave mirror illustrated in FIG. 18 and the other side of the second concave mirror means an opposite side to one side 2433 of the second concave mirror illustrated in FIG. 18.

On the other hand, the concave mirrors 443 and 444 according to the present invention as components disposed at a lowermost portion among the components constituting the display module 440 become components which interfere with the nose which protrudes from the face of the user. Accordingly, in order for the first and second concave mirrors 443 and 444 to provide a space to accommodate the noise without interfering with the nose of the user, as illustrated in FIG. 19, the first and second concave mirrors 443 and 444 include third and fourth chambering portions 4432*a* and 4442*a*, respectively.

The third chamfering part 4432*a* is formed at one side of the first concave mirrors 443 and 444, and the fourth chamfering part 4442*a* is formed at the other side of the second concave mirrors 443 and 444, and when one side of the first concave mirrors 443 and 444 and the other side of the second concave mirrors 443 and 444 are connected to each other, the third and fourth chambering portions 4432*a* and 4442*a* are formed to face each other and as illustrated in FIG. 19, the third and fourth chambering portions 4432*a* and 4442*a* form an inverted triangular space.

Meanwhile, for convenience of description and intuitive understanding in the present invention, since the third and fourth chamfering parts 4432*a* and 4442*a* are merely expressed as the chamfering parts, the shapes of the third and fourth chambering portions 4432*a* and 4442*a* need not particularly limited to the diagonal line shape as illustrated in FIG. 18 and the shape of a space in which the third and fourth chamfering parts 4432*a* and 442*a* are formed while facing each other also need not be limited to an inverted triangular shape. If the space to accommodate the nose of the user may be sufficiently provided, even any shape is available as the shape of the space in which the third and fourth chambering portions 4432*a* and 4442*a* are formed while facing each other.

[Scenario Utilizing Electronic Device According to Present Invention]

Hereinafter, a scenario utilizing the electronic device 20 including the display module according to the present invention will be described with reference to FIGS. 19 to 21.

FIG. 19 is a diagram illustrating a scenario in which an electronic device and a TV are linked with each other by device to device (D2D) according to an embodiment of the present invention and FIGS. 20 and 21 are diagrams illustrating a scenario in which an electronic device according to an embodiment of the present invention provides information on an object which appears in a TV video when a user watches the TV video.

In describing the scenario, for convenience of description, the electronic device 20 including the display module according to the present invention will be described as an example of being implemented as the HMD 400 for AR experience.

Referring to FIG. 20, the user may watch a TV while wearing the HMD 400. The TV is one type of a home appliance 15 and the HMD 400 and the TV 15 are connected to each other through a cloud network 10 to communicate with each other through a base station in device to device (D2D), but the HMD 400 and the TV 15 may directly communicate with each other through a device to device (D2D) communication standard (e.g., Bluetooth).

The user may control a monitor adjustment function (On Screen Display (OSD)) of the TV through an input unit 22 included in the HMD 400 while wearing the HMD 400. In addition, the OSD of the TV may be expressed as a graphic user interface (UI) illustrated in FIG/ 10 through the display module 440. Accordingly, the user may adjust screen states such as brightness contrast of the TV or adjust a volume and a channel through the OSD controlling GUI (UI) displayed in the display module 400 of the HMD 400 without a need to output a separate OSD controlling GUI (U1) to the display unit of the TV.

Besides, the display module 440 of the HMD 400 may output a GUI (U2) representing a TV program organization table by receiving information on the TV program organization table through the TV 15 or the cloud network 10.

Referring to FIGS. 21 and 22, when the user watches the TV video, etc., while wearing the HMD 400, information on the object displayed in the TV video may be output through the display module 440 of the HMD 400. That is, as illustrated in FIG. 21, when the video which is played in the TV is a video about how to cook, the display module 440 of the HMD 400 may display to the user a cook material or a price for a completed cook, a purchasable web, and a recipe for the corresponding cook displayed in the corresponding video through a GUI (U4).

Further, as illustrated in FIG. 22, when the video played in the TV shows a clothing, if the user views the corresponding clothing through the HMD 400, information on the price, a seller, a brand name, and sale information for the corresponding clothing and a related video expressing the corresponding clothing may be displayed to the display module 440 through a separate GUI (U5).

The GUIs U1, U2. U3. U4, and U5 output to the display module 440 may include an external image collected through a photographing means such as a camera, etc., in addition to virtual reality contents.

In addition, the virtual reality contents included in the GUIs U1, U2, U3, U4, and U5 output to the display module 440 may be stored in the electronic device 20 itself which is implemented as the HMD or stored in an external digital device. For example, when the GUIs U1, U2, U3, U4, and U5 are virtual space videos stored in the electronic device 20, the electronic device 20 may perform image processing and rendering processing for processing the video of the virtual space and output image information generated as results of the image processing and the rendering processing through the display module 440. On the contrary, when the GUIs U1, U2, U3, U4, and U5 are the virtual space videos, the external digital device may perform the image processing and the rendering processing and transmit to the electronic device 20 the image information generated as the result of the image processing and the rendering processing. Then, the electronic device 20 may output 3D image information received from the external digital device through the display module 440.

Further, the user may access a surrounding environment or object image visually confirmed while wearing the electronic device 20 through operating the input unit 22. That is, the user may simultaneously experience the actual surrounding environment and the virtual reality contents provided through the electronic device 20.

In the HMD 400 including the display module 240 according to the present invention, the CLC layer simply stacked on the upper surface of the display panel in the VR apparatus in the related art is applied to the polarizer inclined at 45 degrees to allow the user wearing the HMD 400 to basically recognize the surrounding object by penetrating the polarizer, thereby increasing the visible distance of the user by twice compared with the HMD adopting the half-mirror in the related art. The half-mirror is generally configured in which each of the reflectance and the transmittance is half by increasing a light absorption rate. Accordingly, in the HMD 20 according to the present invention, the CLC thin-film layer is stacked on the polarizer 442 having high transmittance to secure the visible distance of the user wearing the HMD 400 and increase light efficiency of the HMD 400 by at least 12.6 to at most 100% compared with the related art.

Further, since the HMD 400 including the display module 440 according to the present invention uses the concave mirrors 443 and 444 of which optimal design is easy in terms of the size and the volume, the distortion aberration and chromatic aberration may be minimized which occur at the time of reflecting the light through the concave mirrors 443 and 444 and the image distortion phenomenon may be prevented.

In particular, the HMD 400 including the display module 440 according to the present invention may also maximize the see-through effect in that the visible distance of the user is secured through the polarizer 442 by arranging all of the polarizer 442 and the concave mirrors 443 and 444 on the visual axis viewed by the user and arranging the concave mirrors 443 and 444 perpendicular to the visual axis viewed by the user.

Further, since the HMD is implemented by using only one polarizer 442 and the concave mirrors 443 and 444, the size and the volume of the HMD 400 including the display module 400 according to the present invention may be smaller than those of the HMD in the related art in which the structure is complicated and the volume is large by using two half-mirrors in order to secure the visible distance of the user.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The aforementioned detailed description should not be construed as restrictive in all terms and should be exemplarily considered. The scope of the present invention should be determined by rational construing of the appended claims and all modifications within an equivalent scope of the present invention are included in the scope of the present invention.

Although the present invention is described based on an example the present invention is applied to an electronic device used in Virtual Reality (VR), Augmented Reality (AR), Mixed Reality (MR), etc., based on a 5 generation (5G) system, the present invention can also be applied to various wireless communication systems and electronic devices.

The invention claimed is:

1. An electronic device which may be worn by a user, comprising:
    a display module,
    wherein the display module includes
    a display panel disposed to emit light in a gravity direction,
    a concave mirror positioned below the display panel,
    a polarizer positioned between the display panel and the concave mirror, and
    a first frame supporting the display panel, the concave mirror, and the polarizer,
    wherein the polarizer includes a cholesteric liquid crystal, and
    wherein the polarizer further includes first and second chamfering parts formed at both corners of a lower portion disposed close to the concave mirror, respectively.

2. The electronic device of claim 1, wherein the polarizer is disposed to form an angle of 45 degrees with the display panel.

3. The electronic device of claim 2, wherein in the polarizer, an upper portion disposed close to the display panel is disposed closer to an eyeball of the user than a lower portion disposed close to the concave mirror.

4. The electronic device of claim 1, wherein the polarizer is formed to transmit left-handed light among the light emitted from the display panel and reflect right-handed light reflected on the concave mirror.

5. The electronic device of claim 4, wherein in the polarizer, an upper surface facing the display panel is subjected to anti-reflection treatment and a cholesteric liquid crystal thin-film layer is stacked on a lower surface facing the concave mirror.

6. The electronic device of claim 1, wherein the concave mirror includes first and second concave mirrors corresponding to left and right eyes of the user, respectively, and
    wherein one side of the first concave mirror and the other side of the second concave mirror are connected to each other.

7. The electronic device of claim 6, wherein third and fourth chamfering parts are formed at one side of the first concave mirror and the other side of the second concave mirror, and when one side of the first concave mirror and the other side of the second concave mirror are connected to each other, the third and fourth chamfering parts face each other.

8. The electronic device of claim 1, further comprising:
    a main frame accommodating the display module therein and including a visor and an eyepiece transmitting the light for the user to recognize a surrounding object and a surrounding environment,
    wherein the polarizer is positioned between the visor and the eyepiece.

9. The electronic device of claim 8, further comprising:
    a head part connected to the main frame,
    wherein the head part includes
    a head rest covering a head of the user, and
    a band of which length is adjustable according to a size of the head of the user.

10. The electronic device of claim 1, further comprising:
    a sensing part sensing an external digital device;
    a device to device communication module allowing data transmission/reception between the external digital device sensed by the sensing part and the electronic device;
    a processor classifying, when receiving information on the external digital device through the device to device communication module, the information to be displayed in the display module; and
    a memory storing data for operating the electronic device,
    wherein the processor classifies the information with a graphic user interface prestored in the memory to display the classified information in the display module.

11. The electronic device of claim 10, further comprising an input part receiving an input of the user,
    wherein when the input of the user is received through the input part, the processor executes a function corresponding to the input among functions prestored in the memory.

12. The electronic device of claim 11, wherein the input part further includes a camera or a video input part for inputting a video signal, a microphone or an audio input part for inputting an audio signal, and a user input part (e.g., a touch key, a push key (mechanical key), etc.) for receiving information from the user.

13. The electronic device of claim 10, wherein the sensing part includes at least one of a proximity sensor, an illumination sensor, a touch sensor, an acceleration sensor, a magnetic sensor, a gravity (G) sensor, a gyroscope sensor, a motion sensor, an RGB sensor, an infrared (IR) sensor, a finger scan sensor, an ultrasonic sensor, an optical sensor, a microphone, a battery gauge, an environment sensor including a barometer, a hygrometer, a thermometers, radiation sensor, a heat sensor, a gas sensor, and chemical sensors including an electronic nose, a healthcare sensor, and a biometric sensor.

14. The electronic device of claim 10, further comprising:
    at least one of a broadcasting module, a mobile communication module, a wireless Internet module, a short-range communication module, and a position module.

* * * * *